US009731686B2

(12) United States Patent
Baik et al.

(10) Patent No.: US 9,731,686 B2
(45) Date of Patent: Aug. 15, 2017

(54) WASHER LIQUID HEATING APPARATUS INTEGRATED INTO WASHER RESERVOIR

(71) Applicants:Hyundai Motor Company, Seoul (KR); Kia Motors Corporation, Seoul (KR); DENSO KOREA AUTOMOTIVE CORPORATION, Changwon-si (KR)

(72) Inventors: Seung Kil Baik, Gunpo-si (KR); Sang Heon Wang, Busan (KR); Seok Cheon Kang, Eunha-myeon (KR)

(73) Assignees: Hyundai Motor Company, Seoul (KR); Kia Motors Corporation, Seoul (KR); DENSO KOREA AUTOMOTIVE CORPORATION, Changwon-si (KR)

( * ) Notice: Subject to any disclaimer, the term of this patent is extended or adjusted under 35 U.S.C. 154(b) by 137 days.

(21) Appl. No.: 14/571,096

(22) Filed: Dec. 15, 2014

(65) Prior Publication Data

US 2016/0031421 A1 Feb. 4, 2016

(30) Foreign Application Priority Data

Jul. 29, 2014 (KR) .......................... 10-2014-0096241

(51) Int. Cl.
*B60L 1/02* (2006.01)
*F24H 1/20* (2006.01)
(Continued)

(52) U.S. Cl.
CPC ................. *B60S 1/488* (2013.01); *B60S 1/50* (2013.01); *F24H 1/102* (2013.01); *H05B 1/0244* (2013.01);
(Continued)

(58) Field of Classification Search
CPC .. B60S 1/488; B60S 1/50; F24H 1/102; F24H 1/202; F24H 9/2021; H05B 3/0014;
(Continued)

(56) References Cited

U.S. PATENT DOCUMENTS 3,888,412 A * 6/1975 Lindo ..................... B60S 1/487
137/599.14
7,775,224 B2 * 8/2010 Franco .................... B60S 1/482
134/198
(Continued)

FOREIGN PATENT DOCUMENTS

JP 7-22872 U 4/1995
JP 2013-10370 A 1/2013
(Continued)

*Primary Examiner* — Dana Ross
*Assistant Examiner* — Hemant Mathew
(74) *Attorney, Agent, or Firm* — Morgan Lewis & Bockius LLP

(57) ABSTRACT

A washer liquid heating apparatus integrated into a reservoir may include a plate-type heater that may be installed in a hole of the reservoir to heat a washer liquid within the reservoir, a protect cover that may be assembled into the reservoir to surround the heater, and a fastening device for fixing the heater and the protect cover to the reservoir, wherein the plate-type heater may be fixed to be exposed to an inside of the reservoir through the hole such that a heating surface where heating may be performed heats the washer liquid within the reservoir.

7 Claims, 13 Drawing Sheets

(51) Int. Cl.
*H05B 3/78* (2006.01)
*B60S 1/48* (2006.01)
*F24H 1/10* (2006.01)
*H05B 3/00* (2006.01)
*H05B 3/28* (2006.01)
*H05B 3/82* (2006.01)
*H05B 1/02* (2006.01)
*H05B 3/04* (2006.01)
*B60S 1/50* (2006.01)
*H05B 3/26* (2006.01)
*H05B 3/84* (2006.01)
*H05B 3/06* (2006.01)
*B60H 1/22* (2006.01)

(52) U.S. Cl.
CPC ............ *H05B 3/0014* (2013.01); *H05B 3/04* (2013.01); *H05B 3/262* (2013.01); *H05B 3/28* (2013.01); *H05B 3/82* (2013.01); *B60H 1/2225* (2013.01); *F24H 1/202* (2013.01); *H05B 3/06* (2013.01); *H05B 3/84* (2013.01); *H05B 2203/005* (2013.01); *H05B 2203/011* (2013.01); *H05B 2203/016* (2013.01); *H05B 2203/021* (2013.01)

(58) Field of Classification Search
CPC ... H05B 3/28; H05B 3/82; H05B 3/04; H05B 3/00; H05B 3/84; H05B 2203/007; H05B 2203/016; H05B 2203/021; H05B 1/0202; H05B 1/0244; H05B 3/06; B60H 1/2225; A47J 31/54
USPC ........ 219/201, 202, 203; 392/441, 445, 447, 392/449–455
See application file for complete search history.

(56) References Cited

U.S. PATENT DOCUMENTS

| | | | | |
|---|---|---|---|---|
| 2005/0047768 | A1* | 3/2005 | Kuebler | B60S 1/488 |
| | | | | 392/493 |
| 2011/0197384 | A1* | 8/2011 | Grandjean | B60S 1/488 |
| | | | | 15/250.01 |
| 2012/0037606 | A1* | 2/2012 | Huang | B60S 1/488 |
| | | | | 219/201 |
| 2012/0055913 | A1* | 3/2012 | Huang | B60S 1/488 |
| | | | | 219/202 |
| 2012/0204374 | A1* | 8/2012 | Shank | B05B 9/002 |
| | | | | 15/250.01 |
| 2016/0031420 | A1* | 2/2016 | Baik | B60S 1/488 |
| | | | | 219/202 |

FOREIGN PATENT DOCUMENTS

| | | |
|---|---|---|
| KR | 97-61923 U | 12/1997 |
| KR | 20-1998-033772 U | 9/1998 |
| KR | 20-1998-044480 U | 9/1998 |
| KR | 20-1998-045959 U | 9/1998 |
| KR | 10-0196210 B1 | 6/1999 |
| KR | 1999-0024374 U | 7/1999 |
| KR | 10-2001-0105736 A | 11/2001 |
| KR | 2003-0032067 A | 4/2003 |
| KR | 10-2007-0075129 A | 7/2007 |
| KR | 10-2012-0020950 A | 3/2012 |
| KR | 10-2012-0044643 A | 5/2012 |
| KR | 10-2014-0147574 A | 12/2014 |

* cited by examiner

WASHER LIQUID HEATING APPARATUS INTEGRATED INTO WASHER RESERVOIR

CROSS-REFERENCE TO RELATED APPLICATION

The present application claims priority to Korean Patent Application No 10-2014-0096241 filed on Jul. 29, 2014, the entire contents of which is incorporated herein for all purposes by this reference.

BACKGROUND OF THE INVENTION

Field of the Invention

The present disclosure relates to a heating apparatus of washer liquid for a vehicle. More particularly, it relates to a heating apparatus of washer liquid for a vehicle through which the problems caused from viscosity increase of washer liquid, such as a decline of discharging pressure of a washer pump, a poor supply of washer liquid and a poor landing location of washer liquid, a poor cleaning of glass, damages to a washer pump and an operation switch and the like can be improved.

Description of Related Art

Generally, it is one of the most important factors to ensure a good front sight for driving safely a vehicle.

Accordingly, a wiper device is generally arranged on a vehicle to remove foreign substance attached on a surface of a wind shield glass and clean rain on a surface of the glass when it rains so as to ensure a front sight for a driver.

Further, an injection device of washer liquid is provided on a vehicle for injecting washer liquid onto a surface of the glass so as to easily remove foreign substance while a surface of a wind shield glass is cleaned.

The injection device of washer liquid is configured such that washer liquid stored in a reservoir is press-transferred by a washer pump (washer motor) and is injected onto a surface of a glass by an injection nozzle wherein the injection nozzle is generally arranged in a cowl top or a hood of a vehicle.

FIG. 1 is a view illustrating schematically an injection device of washer liquid wherein the injection device of washer liquid includes a reservoir 1 in which the washer liquid is stored, a washer pump 2 that is arranged on the reservoir 1 and press-transfers washer liquid stored in the reservoir through a washer hose 3, and a washer nozzle 4 for injecting the washer liquid that is press-transferred through the washer hose 3 onto a surface of a wind shield glass 5.

Under this configuration when a driver starts-on an operational switch (washer switch within multi-function switch), the washer pump 2 is operated to press-transfer washer liquid stored in the reservoir 1 and the press-transferred washer liquid is injected onto a surface of the glass 5 through the washer nozzle 4.

Meanwhile, the washer liquid may be frozen at a cold zone or low temperature, and further viscosity of the washer liquid is increased as temperature is decreased wherein a poor injection of washer liquid may be made when the viscosity of washer liquid is increased.

Accordingly, as shown in FIG. 2, a heating device 6 may be arranged on an intermediate of the washer hose 3 to heat the washer liquid, wherein the conventional heating device 6 includes a housing through which the washer liquid that is press-transferred to the injection nozzle 4 through the washer pump 2 can pass.

The housing has an input port and output port at front end and rear end, to which the washer hoses 3 are connected, respectively, and through which the washer liquid is input and output, respectively, and a heater bar that is operated to heat in accordance with control signal from a controller is embedded in the housing.

As a result, the washer liquid that is press-transferred by an operation of the washer pump 2 is heated by the heat bar while it passes through inside the housing of the heating device 6 arranged on an intermediate of the washer hose 3 and then is supplied to the injection nozzle 4 through the washer house 3.

Under this configuration when a driver starts-on an operational switch, the washer pump 2 is operated and at the same time electric power is applied to the heating device 6, and the heating device 6 heats washer liquid while the washer liquid is press-transferred by the wash pump 2 so that the heated washer liquid is supplied to the injection nozzle 4 through the washer hose 3 to be injected.

However, the heating device 6 is arranged on an intermediate of the washer hose 3 while it is separated from the reservoir 1 so that the heating device is possible to heat the washer liquid that is press-transferred through the washer hose, but when a viscosity of the washer liquid stored in the reservoir 1 is increased due to condition such as temperature, etc., the washer pump 2 installed on the reservoir does not push easily the washer liquid, and thus landing location of the washer liquid becomes poor due to a decrease of a discharging pressure of the washer pump.

That is, the decrease of discharging pressure of the washer pump due to the increase of viscosity of the washer liquid and thus the poor landing location of the washer liquid and poor cleaning of a glass occur regardless of installing a heating device.

Specially, when viscosity of the washer liquid is increased, the current for operating the washer pump 2 is increased thereby to carbonize the washer pump (washer motor) and at the same time the contact point of an operational switch (washer switch within multifunction switch) and cause damage thereto.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heating device of washer liquid for a vehicle through which viscosity increase of washer liquid can be prevented through effective heating of washer liquid and the problems caused from viscosity increase of washer liquid can be solved.

Various aspects of the present invention are directed to providing a heating device of washer liquid through which the problems caused from the separation of a reservoir and a heating device of washer liquid according to a related art, that is, the problems caused from viscosity increase of washer liquid within the reservoir, such as a decline of discharging pressure of a washer pump, a poor supply of washer liquid and a poor landing location of washer liquid, a poor cleaning of glass, damages to a washer pump and an operation switch and the like can be improved.

In an aspect of the present invention, a washer liquid heating apparatus integrated into a reservoir, may include a plate-type heater that is installed in a hole of the reservoir to heat a washer liquid within the reservoir, a protect cover that is assembled into the reservoir to surround the heater, and a fastening device for fixing the heater and the protect cover to the reservoir, wherein the plate-type heater is fixed to be exposed to an inside of the reservoir through the hole such that a heating surface where heating is performed heats the washer liquid within the reservoir.

The heater may include a plate-type base member, a lower insulation layer laminated on the base member, a heating body that is laminated over the lower insulation layer, an electrode for applying external electric power to the heating body, and an upper insulation layer that is laminated over the heating body and the electrode, wherein a plurality of heating bodies formed to be long over the lower insulation body are arranged at a predetermined interval to be patterned.

The washer liquid heating apparatus may further include a connection member that is connected along a surrounding portion of the heater, wherein the fastening device is a ring-shaped mounting member that is press-in the hole of the reservoir to be fixed thereto while surrounding an outer surface of the connection member and a bonded portion of the connection member and the protect cover.

The connection member is formed in a ring shape and the heater is connected to an inside of the connection member, and a flange is formed to be protruded along surrounding portion of the connection member and the protect cover such that the mounting member is assembled to surround the bonded portion of both flanges while the flange of the connection member and the flange of the protect cover are bonded.

The mounting member is connected to the reservoir, the connection member, and the protect cover in a close contact state to prevent leakage of the washer liquid within the reservoir while it is press-in the hole of the reservoir.

A catching groove is formed along a surrounding portion of an outer surface of the mounting member at a lower part of the press-in portion that is inserted into the hole of the reservoir and a press-in portion at an upper part serves as a catching step while a surrounding portion of the hole of the reservoir is fitted into the catching groove to be connected thereto.

A flange is formed to be protruded along a surrounding portion of the heater, which is bonded to the flange of the protect cover, and the fastening device is a bolt for fastening the bonded portion while the flange of the heater, the flange of the protect cover, and a surrounding portion of the hole of the reservoir are bonded.

A waterproof pad is interposed between the flange of the heater and the flange of the protect cover to be bonded each other, and between the flange of the heater and a surrounding portion of the hole of the reservoir to prevent leakage of washer liquid.

The hole of the reservoir to which the heater is installed is formed on a bottom or a floor of the reservoir where the washer liquid within the reservoir continuously remains.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
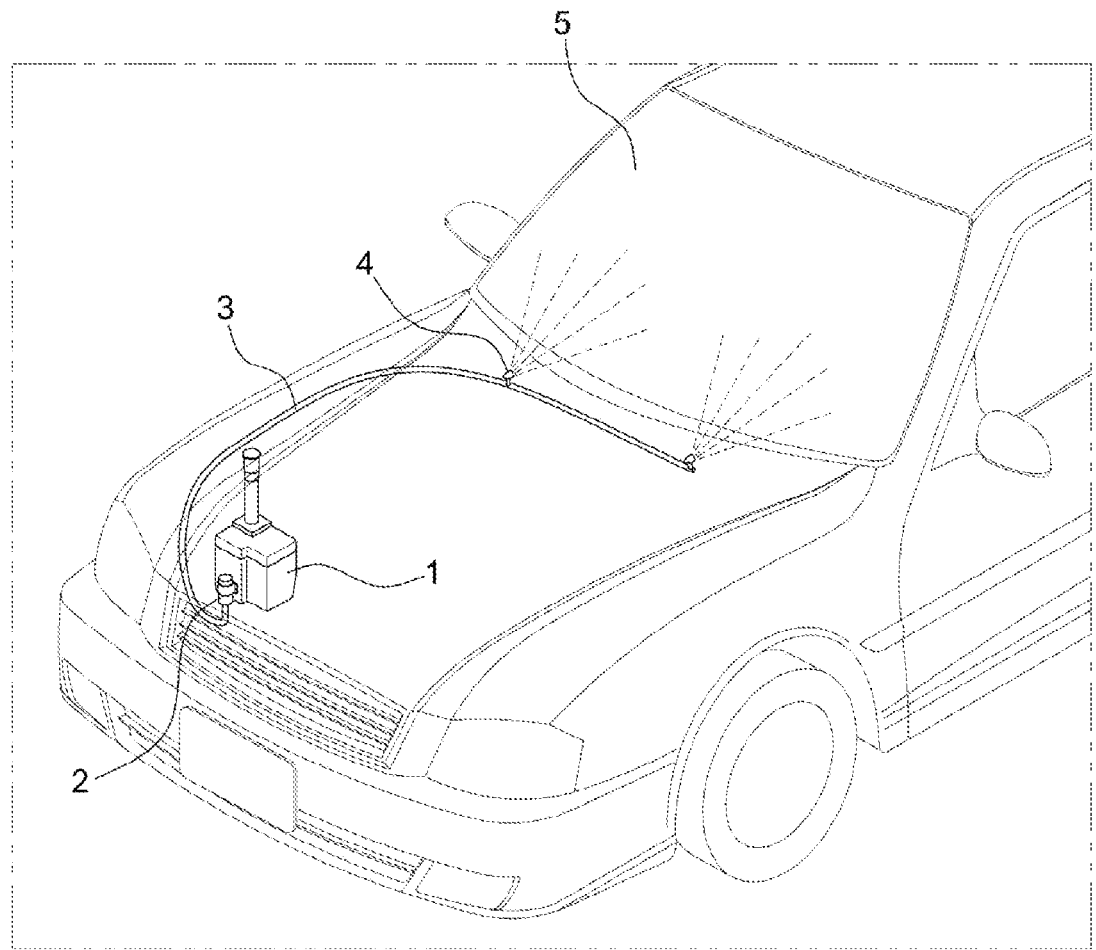
FIG. 1 is a view illustrating schematically a general injection device of washer liquid.
Figure 2:
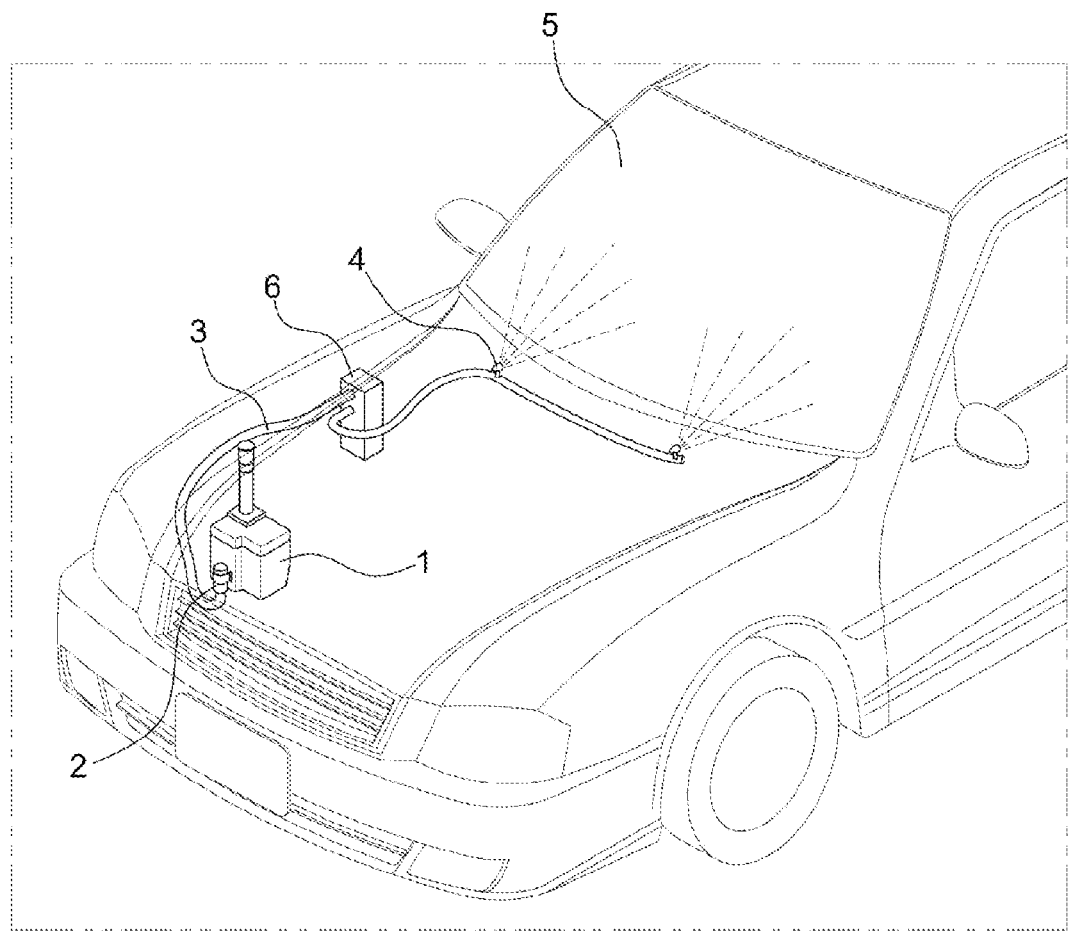
FIG. 2 is a view illustrating schematically an injection device of washer liquid having a conventional heating device.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention is to provide a heating device of washer liquid capable of improving problems caused from viscosity increasing of washer liquid under low temperature, and more particularly, to provide a heating device of washer liquid through which a conventional configuration where a reservoir and a heating device of washer liquid are separated is improved so that the problems caused from viscosity increasing of washer liquid within a reservoir such as a decline of discharging pressure of a washer pump, a poor supply of washer liquid and a poor landing location of washer liquid, a poor cleaning of glass, damages to a washer pump and an operation switch and the like can be improved.

To this end, it is featured that a heating device of washer liquid according to an exemplary embodiment of the present invention is installed integrally to a reservoir in which washer liquid is stored to heat directly washer liquid within the reservoir.

Figure 3:
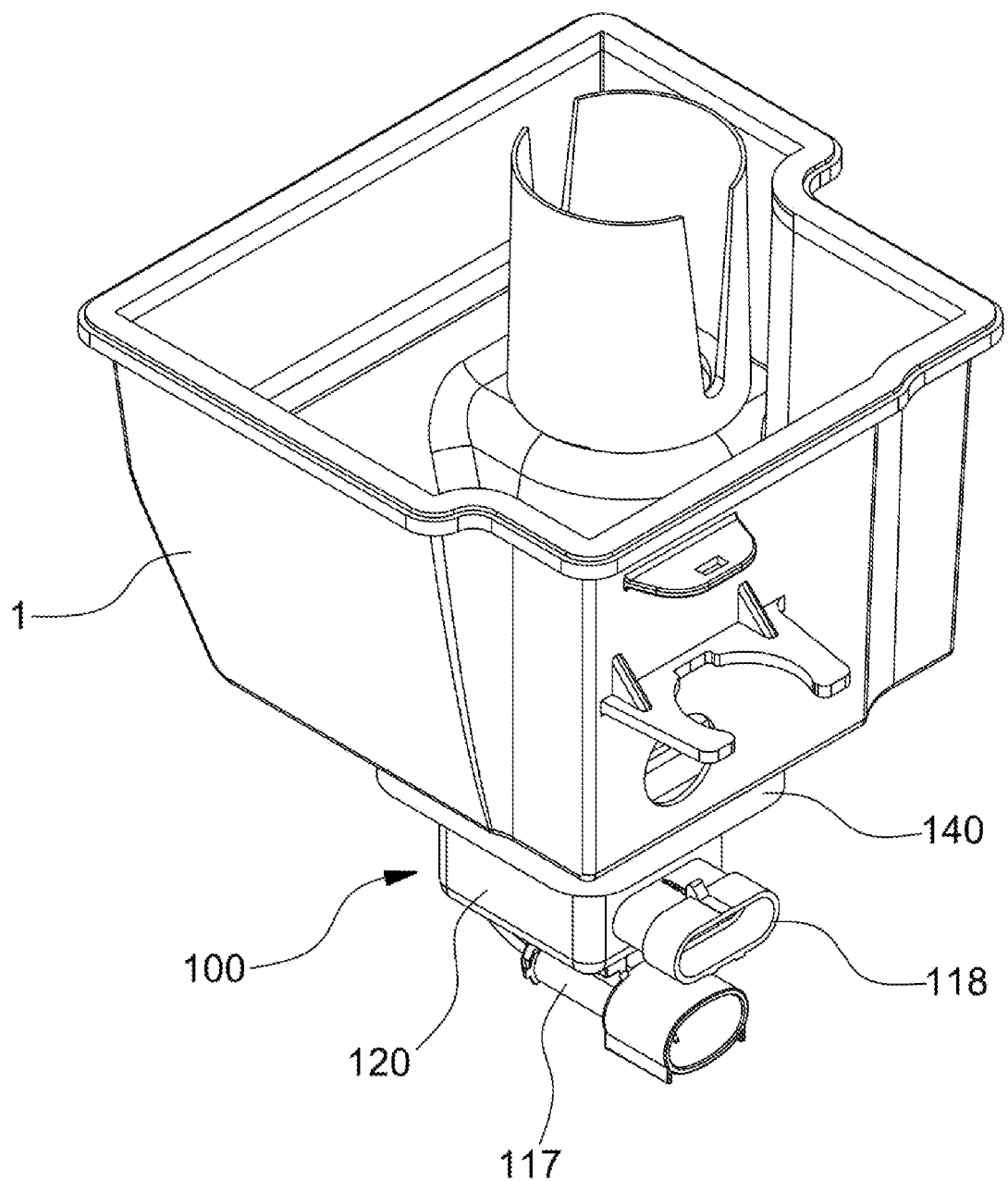
FIG. 3 and FIG. 4 are perspective views illustrating a state where a heating device of washer liquid is installed integrally to a reservoir according to an exemplary embodiment of the present invention.
Figure 4:
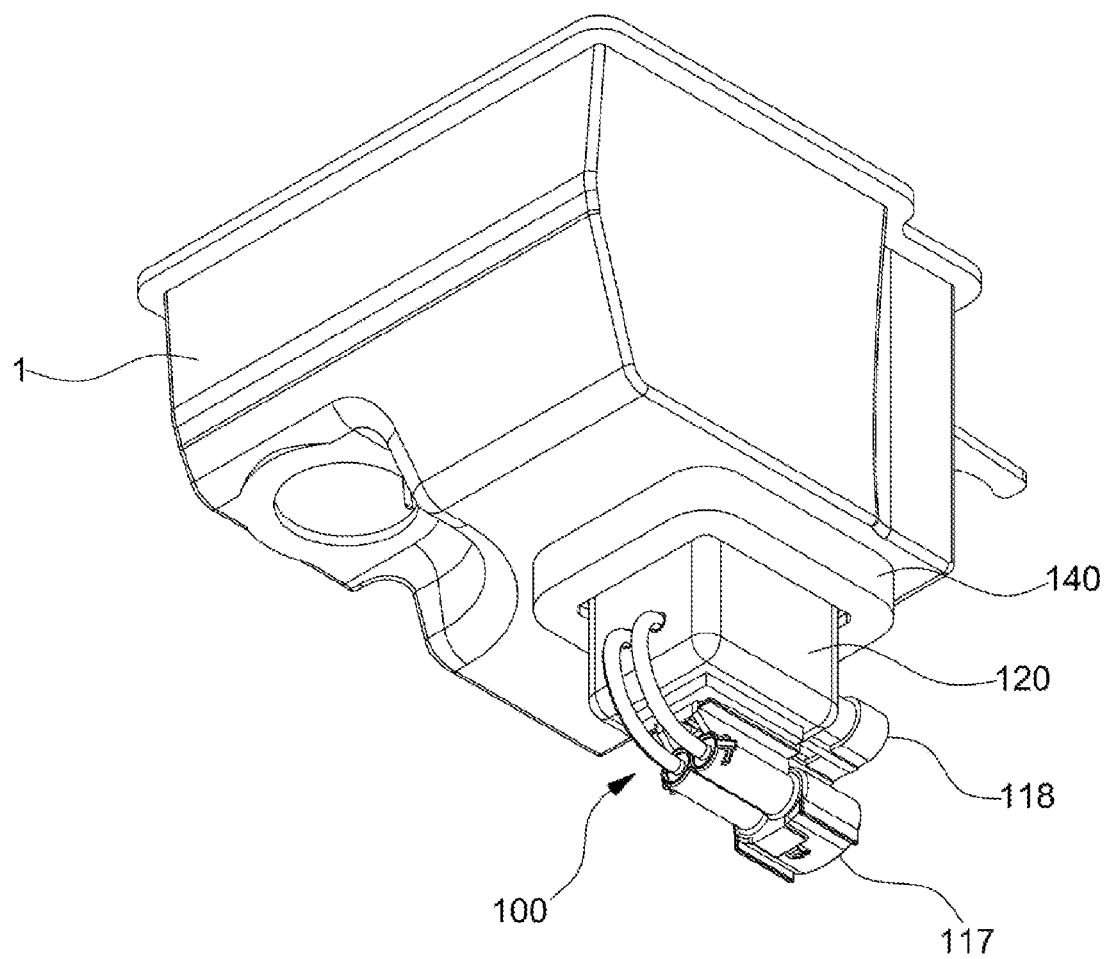

FIGS. 3 and 4 are perspective views illustrating a heating device of washer liquid according to an exemplary embodiment of the present invention wherein FIG. 3 is a flat perspective view illustrating a heating device of washer liquid that is installed integrally to a reservoir according to an exemplary embodiment of the present invention and FIG. 4 is a bottom perspective view.

A reservoir 1 in which washer liquid is stored includes an upper tank and a lower tank separately, wherein the upper tank and the lower tank are assembled vertically to have a closed-inner space with a predetermined volume.

Here, only a lower tank of upper and lower tanks constituting a reservoir 1 is shown in FIGS. 3 and 4 and a heating device of washer liquid 100 is installed integrally to the lower tank.

Figure 5:
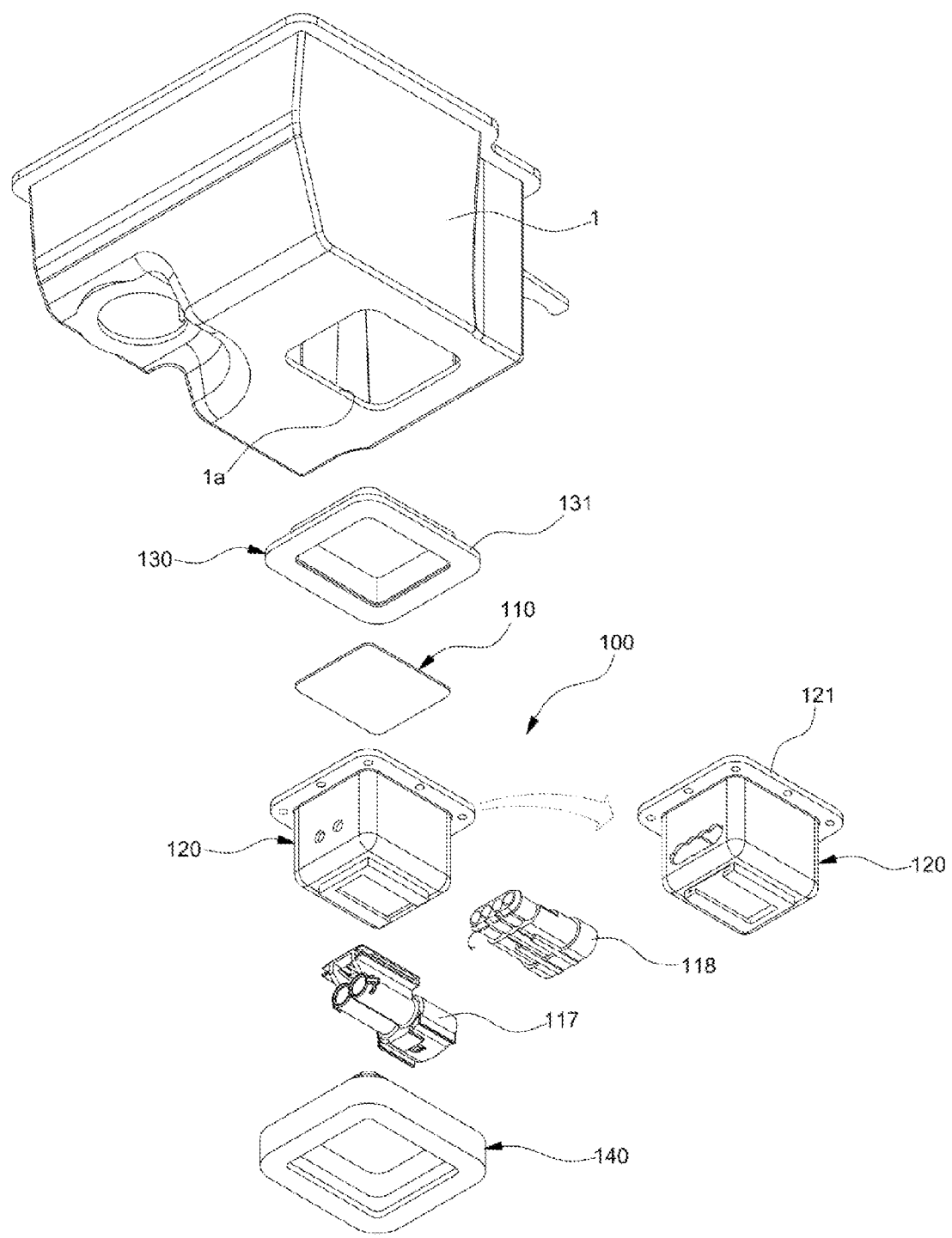
FIG. 5 is an exploded-perspective view illustrating a heating device of washer liquid according to an exemplary embodiment of the present invention.
Figure 6:
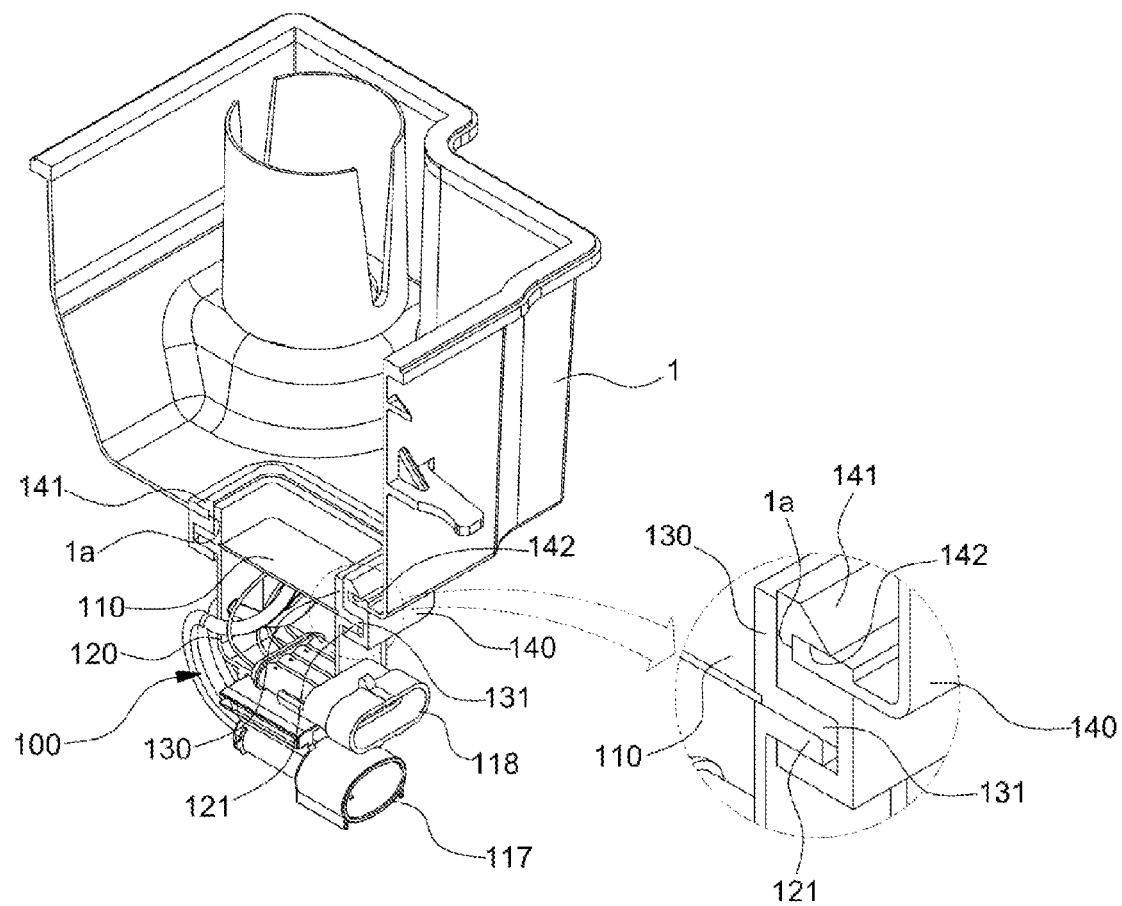
FIG. 6 is a cut perspective view illustrating a state where a heating device of washer liquid is installed according to an exemplary embodiment of the present invention.

FIG. 5 is an exploded-perspective view illustrating a heating device of washer liquid according to an exemplary embodiment of the present invention and FIG. 6 is a cut perspective view illustrating a state where a heating device of washer liquid is installed to a reservoir according to an exemplary embodiment of the present invention.

As shown in FIGS. 5 and 6, a heating device of washer liquid 100 according to an exemplary embodiment of the present invention is installed integrally to a reservoir 1 in which washer liquid is stored to heat directly the washer liquid stored in the reservoir.

Further, the heating device of washer liquid 100 according to an exemplary embodiment of the present invention may be a position where it can heat the washer liquid regardless of the amount of washer liquid within the reservoir 1, that is, at a lower part of the reservoir, and has a plate-type heater 110 that is fixed to an inner space of the reservoir to be faced thereto thereby to heat directly the washer liquid within the reservoir.

In an exemplary embodiment of the present invention, the heating device of washer liquid 100 may be installed on a bottom or a floor of the reservoir 1, and a hole 1a is formed on a bottom or a floor of the reservoir 1 and the plate-type heater 110 contacts directly the washer liquid within the reservoir through the hole 1a.

At this time, the plate-type heater 110 is fixed and disposed to finish the hole 1a of the reservoir 1, and is fixed to be exposed to the inside of the reservoir 1 through the hole 1a such that a heating surface where heating is performed heats the washer liquid within the reservoir.

Further, even though the plate-type heater 110 is exposed inside the reservoir through the hole 1a of the reservoir 1, the heating needs to be performed within washer liquid to prevent overheating thereby to protect the heater 110 wherein the hole 1a of the reservoir 1 to which the plate-type heater is installed is formed at a position where the washer liquid within the reservoir always remains even though the washer pump is operated.

That is, the hole 1a is formed on a bottom or a floor of the reservoir, which is lower than a position where washer liquid is inhaled by the washer pump in the reservoir 1, and in which a permanent remaining amount of washer liquid within the reservoir exists.

In more detailed description, a heating device of washer liquid 100 according to an exemplary embodiment of the present invention includes: a plate-type heater 110 that is fixed to a hole 1a of the reservoir to heat washer liquid within the reservoir 1 by receiving electric power, a protect cover 120 that is assembled into the reservoir 1 to surround and protect the heater 110, and a ring-shaped mounting member 140 that is assembled to surround the surrounding portion of the heater 110 and the protect cover 120, fixes and supports the heater and the protect cover, and prevents leakage of washer liquid while it is press-in the hole 1a of the reservoir 1.

Figure 7:
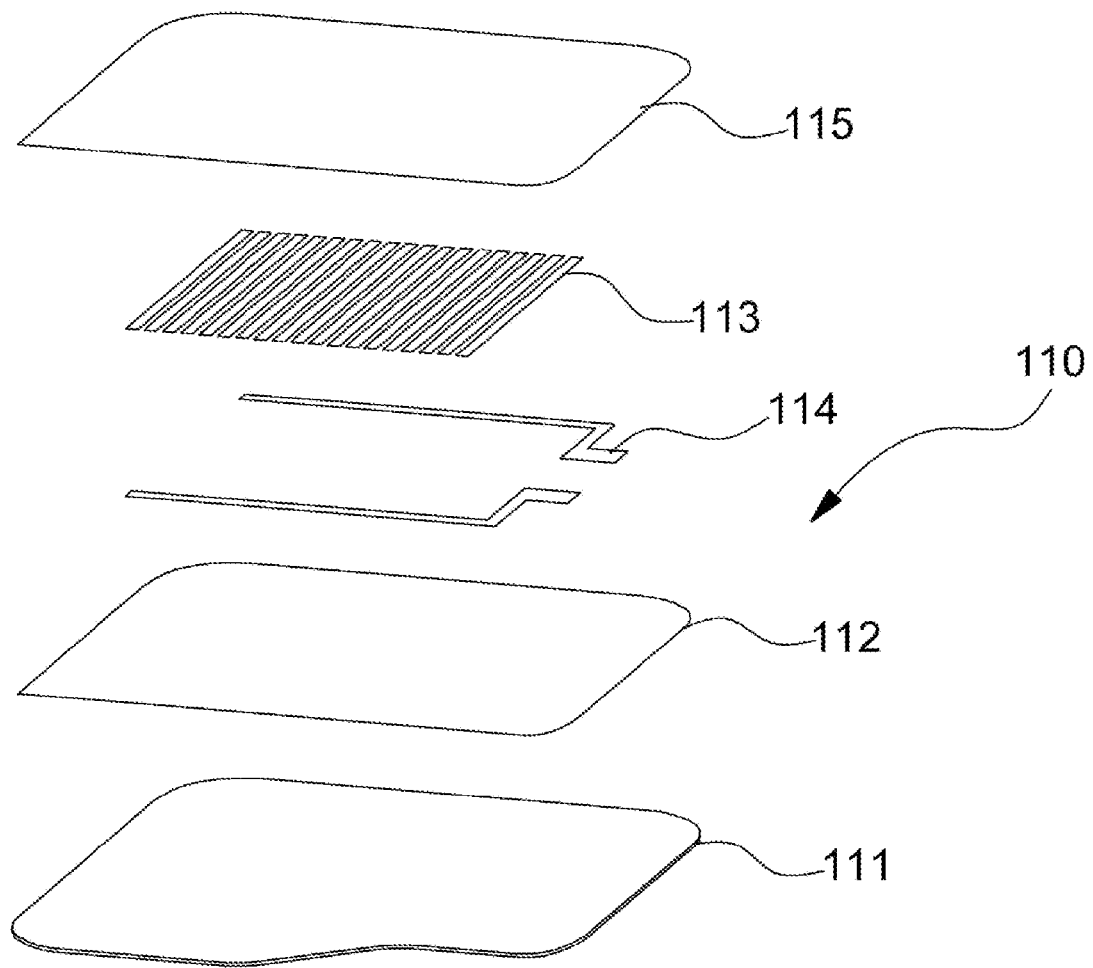
FIG. 7 is an exploded-perspective view illustrating a plate-type heater according to an exemplary embodiment of the present invention.

Here, the plate-type heater 110, as shown in FIG. 7, includes a plate-type base member 111, a lower insulation layer 112 laminated on the base member 111, a heating body 113 that is patterned to be thin and long and laminated over the lower insulation layer 112, an electrode 114 for applying external electric power to the patterned-heating body 113 and an upper insulation layer 115 that is laminated over the heating body 113 and the electrode 114.

The base member 111 becomes a base material serving as a supporter for supporting the heating body 113 and the electrode 114 and it may be made of metal such as stainless steel or synthetic resin and further insulation material is coated on an upper surface of the base member 111 to form the lower insulation layer 112.

Figure 8:
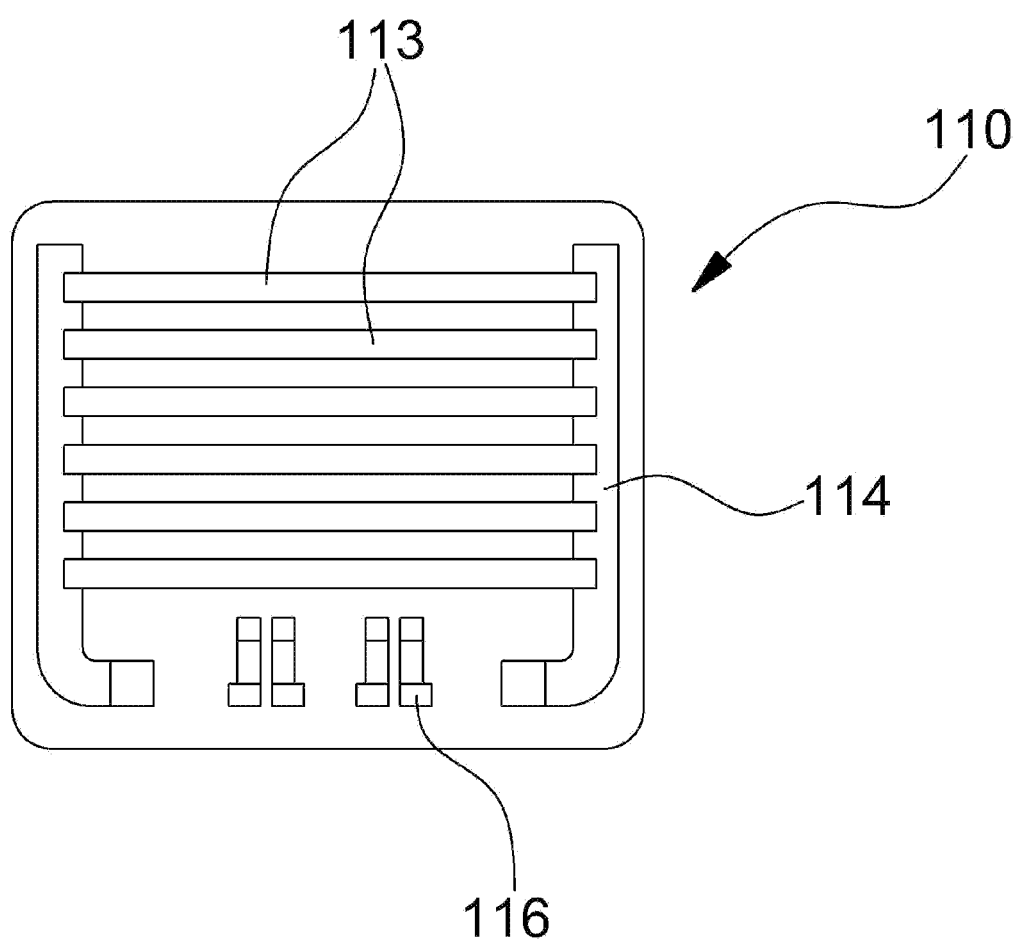
FIG. 8 is a flat view illustrating a patterned-heating body and electrode of a plate-type heater according to an exemplary embodiment of the present invention.
Figure 9:
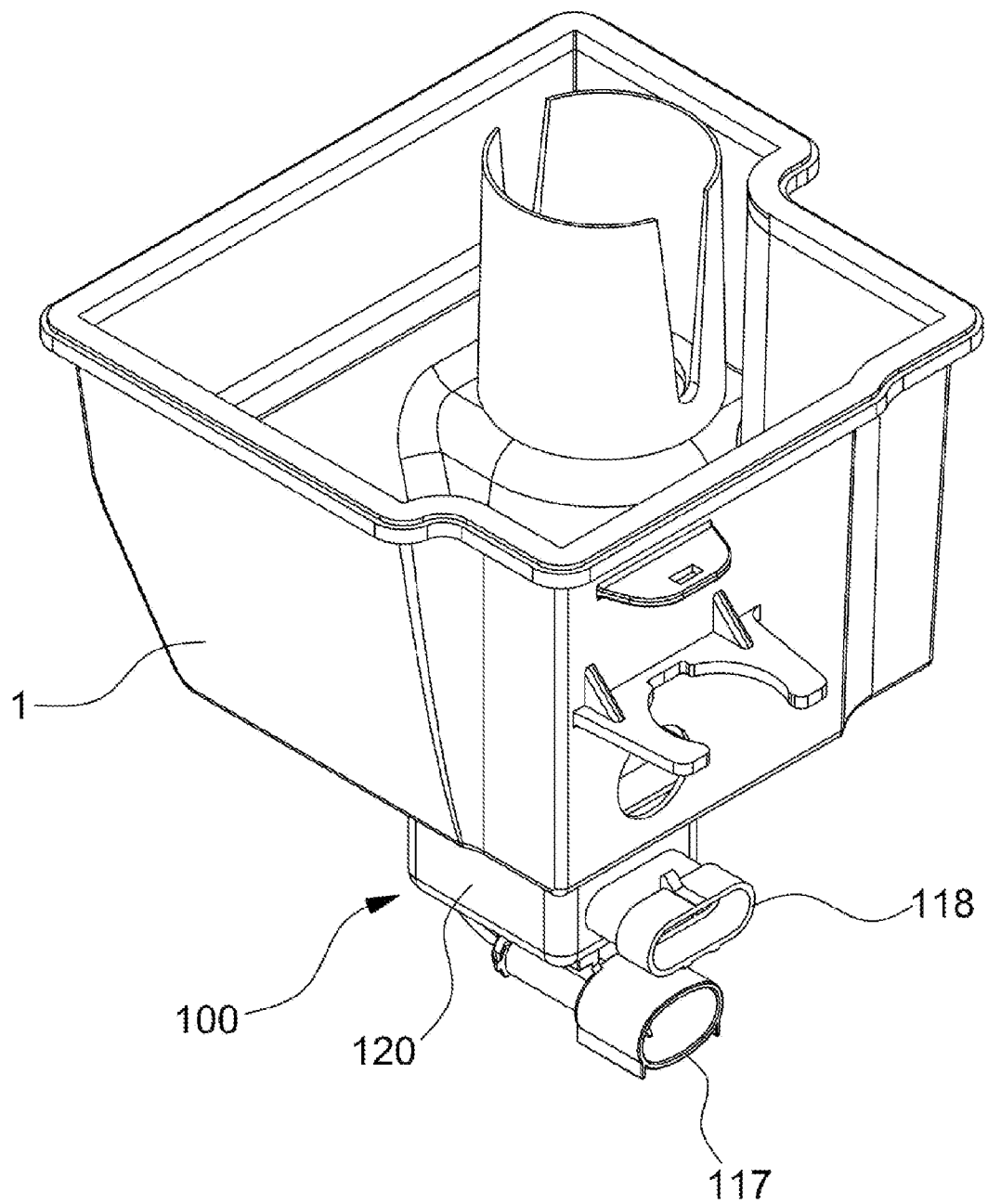
FIG. 9 and FIG. 10 are perspective views illustrating a state where a heating device of washer liquid is installed integrally to a reservoir according to another embodiment of the present invention.
Figure 10:
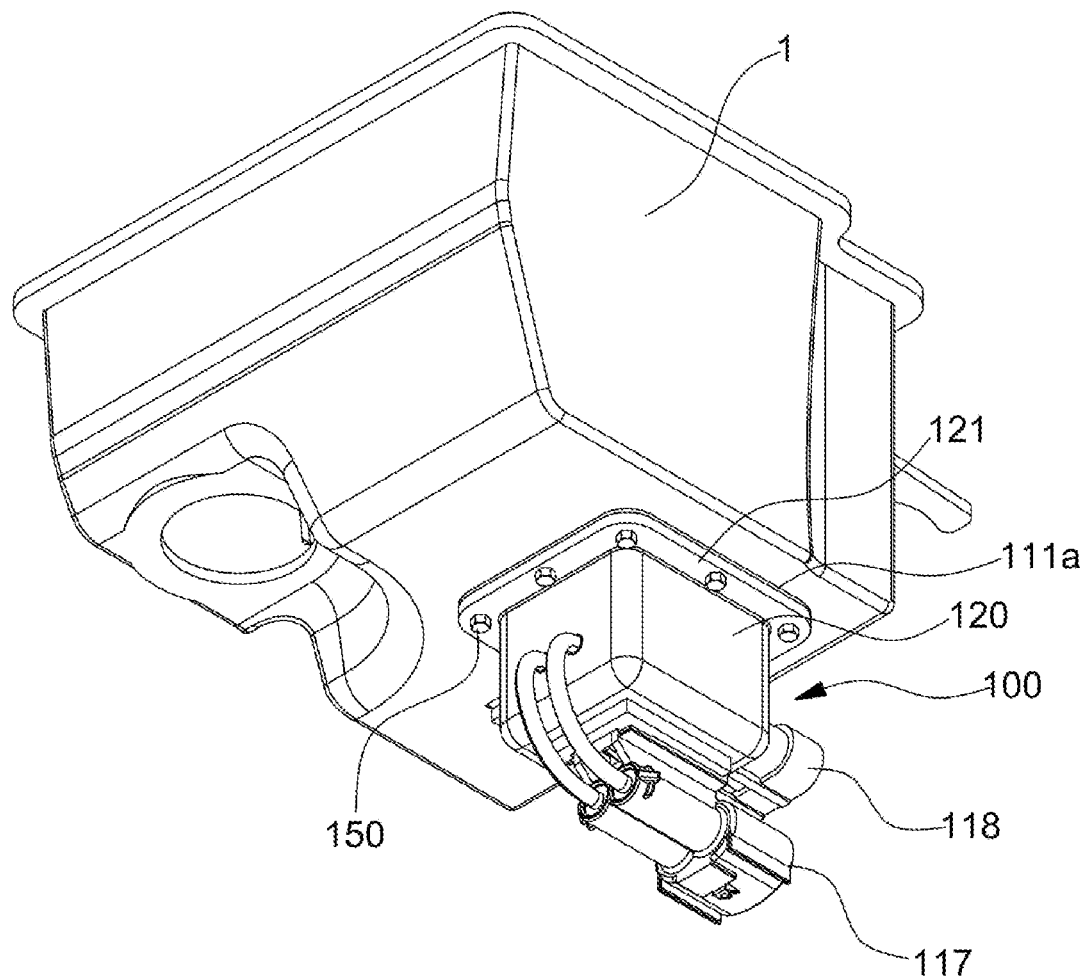
Figure 11:
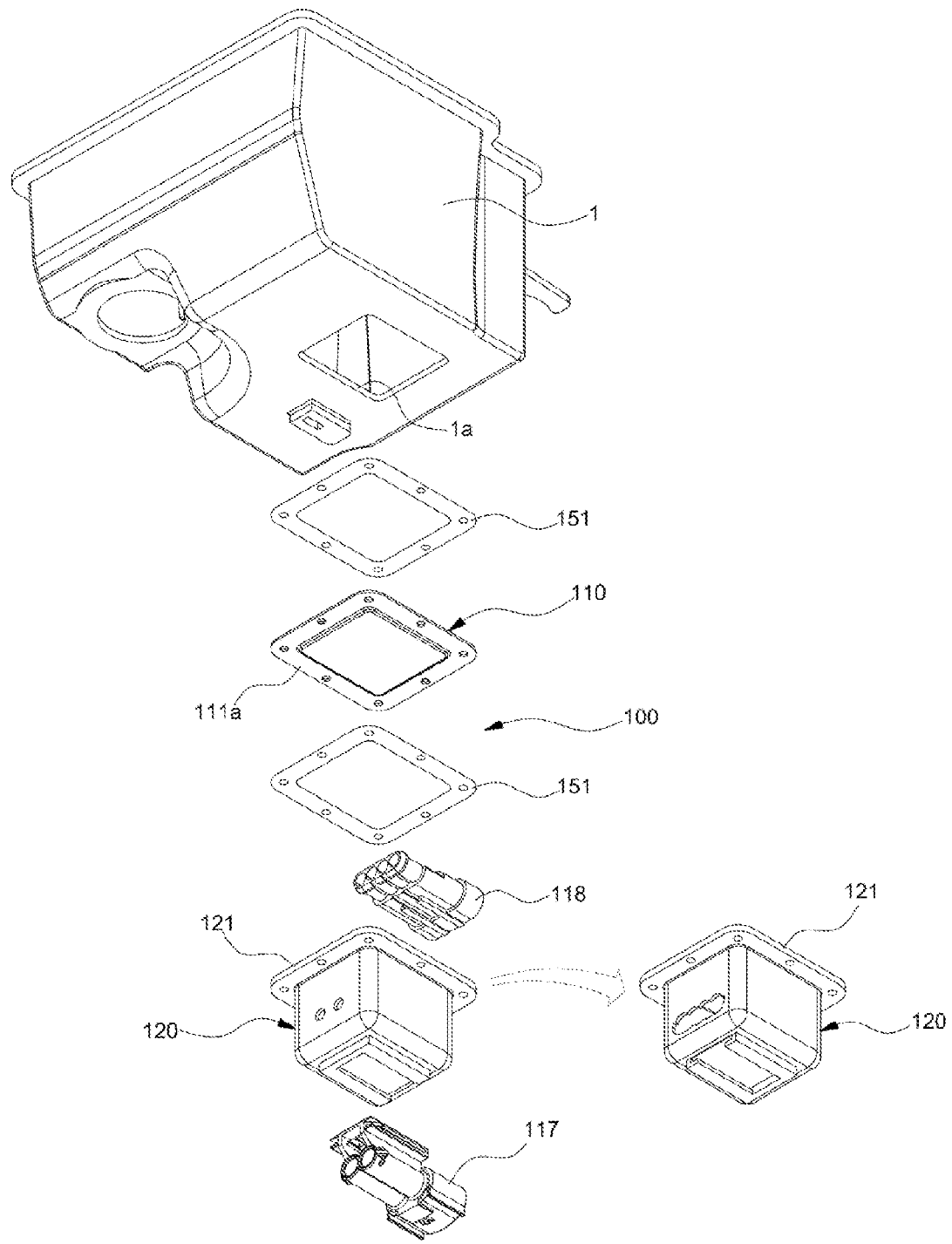
FIG. 11 is an exploded-perspective view illustrating a heating device of washer liquid according to another embodiment of the present invention.

FIG. 8 is a flat view illustrating a plate-type heater 110 according to an exemplary embodiment of the present invention wherein a plurality of heating bodies 113 that are patterned to be thin and long are arranged laterally at a predetermined interval on the lower insulation layer 112 and the electrodes 114 are arranged extending longitudinally to be connected commonly to both ends of the patterned-heating body 113.

With respect to configuring the plate-type heater 110, as illustrated in the exemplary embodiment, a plurality of heating bodies 113 that are thin and long are arranged evenly through an entire area of the heater at a predetermined interval, thereby making heating area thereof large and not concentrating heat on a specific portion by decreasing integration degree of heat.

A connector 117 for electric power is connected to the electrode 114 through a wire and when electric power is applied to the heating body 113 through the connector 117 and the electrode 114 in accordance with control signal from a controller, the heating body 113 is operated to heat washer liquid.

The upper insulation layer 115 is formed over the patterned-heating body 113 and the electrode 114 by coating insulation material.

The reference numeral 116 in FIG. 8 refers to a connection terminal for a thermistor that is attached for detecting temperature of the heater 110 including the heating body 113, the connection terminal 116 is connected to a connector for the thermistor 118 through a wire, and a controller is connected to the connector for thermistor 118 through a wire.

As a result, the controller controls an operational electric power for the heater, that is, the electric power that is applied to the heating body 113 in accordance with temperature of the heater 110 that is detected by a thermistor, and basically when a driver operates an operational switch (washer switch), it applies electric power to operate the heater 110, and when the heater 110 is over-heated to a reference temperature or more, it turns off the heater by cutting off electric power.

The protect cover 120 is assembled to protect the heater 110 by covering a lower part thereof wherein a flange 1221 is formed to be protruded along a surrounding of an opened-upper surface thereof while it has an inner space of a predetermined volume.

At this time, as illustrated in the exemplary embodiment, the connector for electric power 117 may be installed on an outer surface of the protect cover 120 or the reservoir 1, and in this case the wire connected to the connector for electric power 117 passes through the protect cover 120 to be connected to the electrode 114 of the heater 110.

Further, the connector for thermistor 118 is assembled for itself to pass through the protect cover 120 and is connected to the connection terminal for thermistor 116 of the heater 110 through a wire within the protect cover 120 as well.

Further, according to an exemplary embodiment of the present invention, the plate-type heater 110 may be connected to the protect cover 120 and the mounting member 140 via a separate connection member 130 which is used for connecting the heater 110 to the protect cover 120 and the mounting member 140 and an inner part of which is shaped as a ring into which the plate-type heater 110 is put and is connected to a surrounding portion of the heater.

According to an exemplary embodiment of the present invention, the connection member 130 may be formed integrally by injection-molding along a surrounding portion of the heater 110, along a lower surrounding of which a flange 131 is formed to be protruded.

Further, the ring-shaped mounting member 140 as a fastening means is assembled to surround an outer side of the connection member 130 including the bonding portion of the flanges 121 and 131 while the flange 131 of the connection member 130 and the flange 121 of the protect cover 120 are bonded and thus the connection member 130, the protect cover 120, and the heater 110 are kept in an integrally assembled state by the mounting member 140.

The mounting member 140 is a fastening means in the reservoir 1 for fixing and supporting the heater 110, the connection member 130 and the protect cover 120, and at the same time is a sealing and waterproof member for preventing leakage of washer liquid by closing gaps between the components and the reservoir, wherein it may be formed of molding material having small elasticity and enough supporting force such as hard rubber to support the heater 110, the connection member 130, and the protect cover 120.

As a result, the mounting member 140 fixes the connection member, the heater, and the protect cover not to be moved while it is in close contact with the reservoir 1, an outer surface of the connection member 130, the flange 131, and the flange 121 of the protect cover 120, and especially prevents leakage of washer liquid while it is closely contacted to the reservoir, the connection member and the protect cover.

The mounting member 140 is press-in the hole 1a of the reservoir 1 to be fixed thereto while it is assembled into the connection member 130, the heater 110, and the protect cover 120, wherein a press-in portion 141 that is inserted into the hole of the reservoir to be fixed thereto is formed on an upper part of the mounting member 140 and a catching groove 142 into which a surrounding portion of the hole 1a of the reservoir 1 is fitted to be connected thereto is formed along a surrounding portion of an outer surface of the mounting member at a lower part of the press-in portion 141.

As a result, while the press-in portion 141 of the mounting member 140, which is an upper portion based on the catching groove 142, is inserted into the hole 1a of the reservoir 1, a surrounding portion of the hole 1a of the reservoir 1 is fitted into the catching groove 142 of the mounting member 140 to be caught thereon, and eventually the press-in portion 141 that is protruded based on the catching groove 142 serves as a catching step and as a result, the mounting member 140 is fixed firmly to the hole 1a of the reservoir 1 not to be separated therefrom.

Eventually, the connection member 130, the heater 110, and the protect cover 120 are kept in a state of being fixed to the reservoir 1 by the mounting member 140, and it becomes a state where the entire heating device 100 including the connection member 130, the heater 110, and the protect cover 120 is installed integrally to the reservoir 1.

Further, the mounting member 140 and the connection member 130 are formed in a ring shape to be assembled and thus the heater 110 that is disposed at a central inner side thereof is fixed in a form that closes the hole 1a of the reservoir 1, and an upper surface of the heater 110 (being a heating surface) is exposed to the inside of the reservoir 1, thereby capable of heating directly washer liquid by the heater.

Meanwhile, FIGS. 9 to 12 are views illustrating another embodiment of the present invention, wherein as shown in the drawings, the plate-type heater 110 may be fixed directly to the reservoir 1 by fastening a bolt 150.

According to the exemplary embodiment of FIGS. 9 to 12, instead of deleting a mounting member, a heater assembly configured by assembling a plate-type heater 110, a connector for electric power 117, a connector for thermistor 118, and a wire is fastened and fixed directly to a reservoir 1 with the blot 150 together with a protect cover 120.

Figure 12:
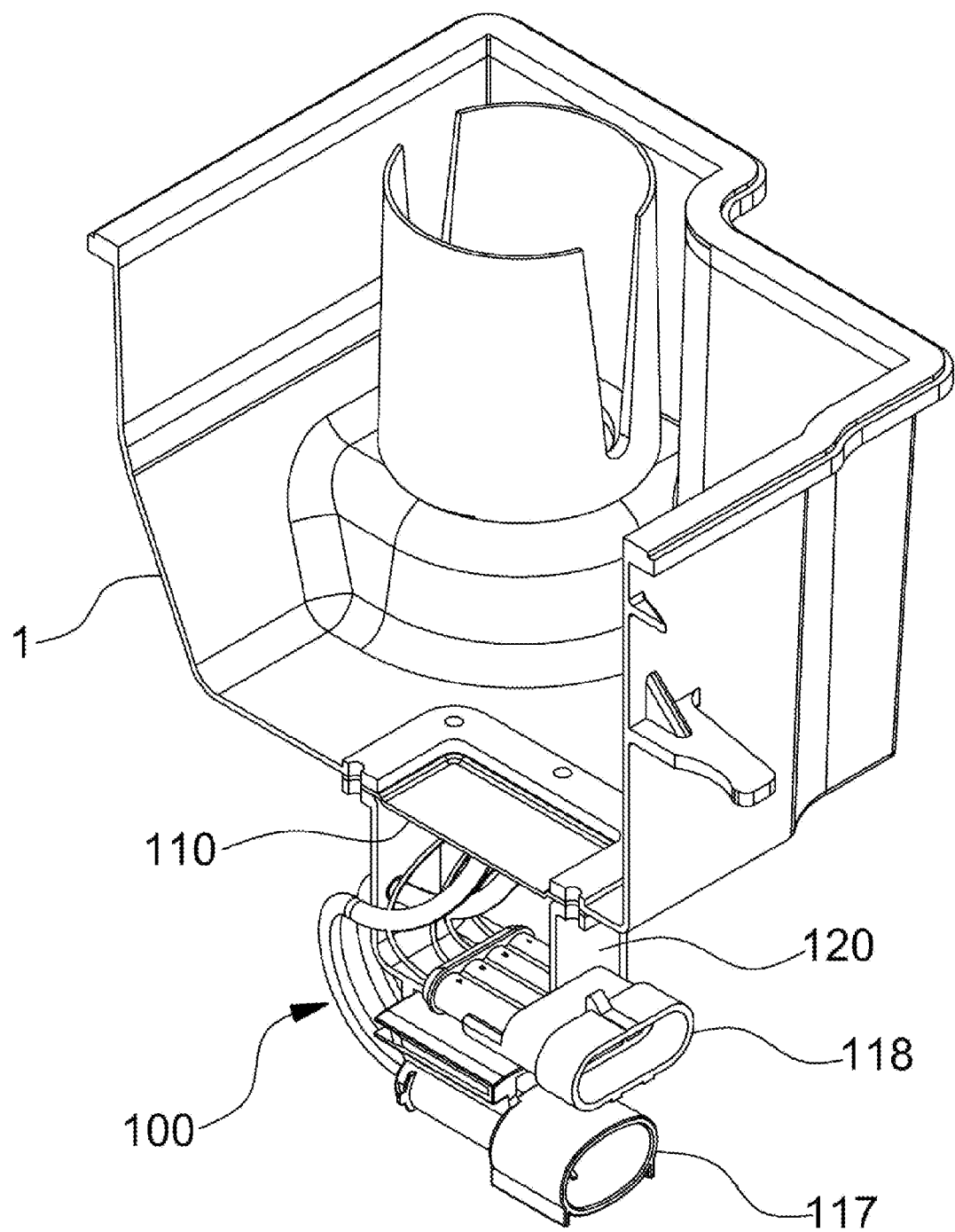
FIG. 12 is a cut perspective view illustrating a state where a heating device of washer liquid is installed according to another embodiment of the present invention.
Figure 13:
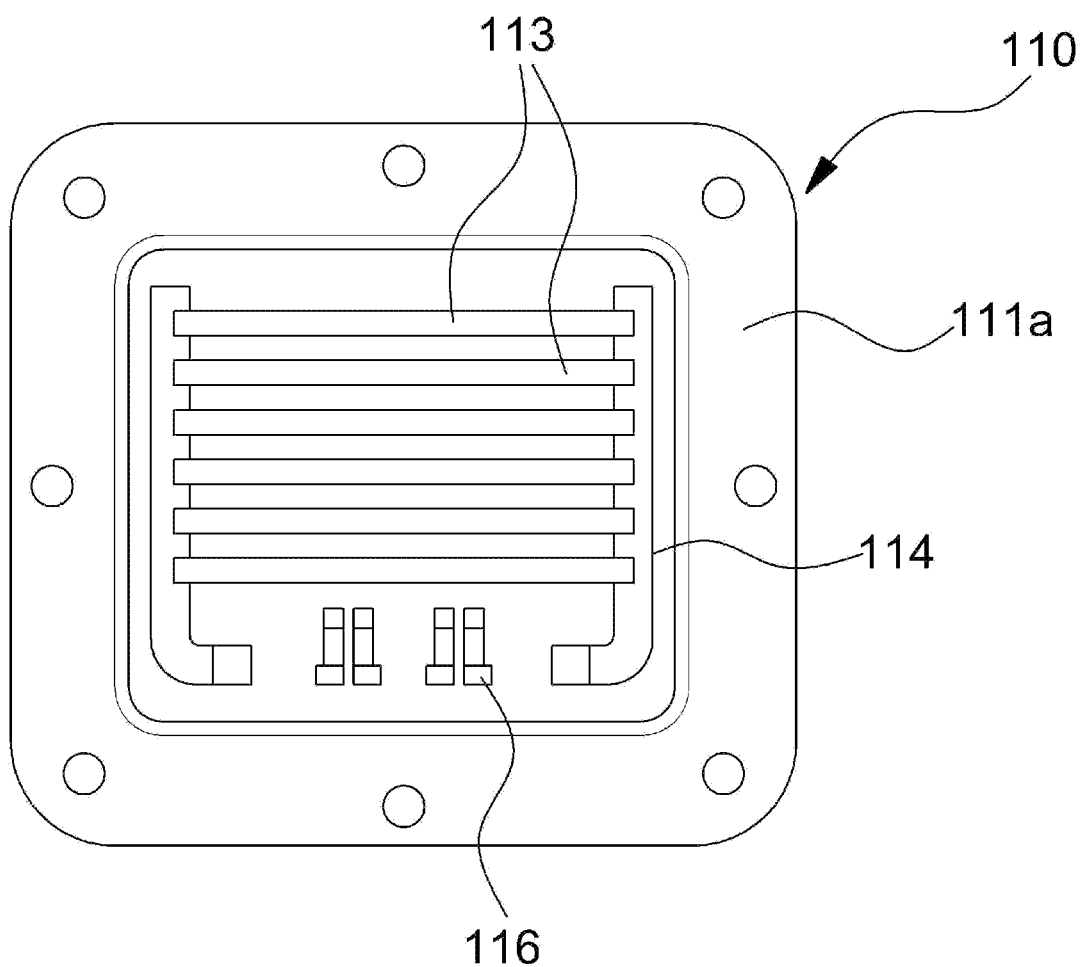
FIG. 13 is a flat view illustrating a patterned-heating body and electrode of a plate-type heater according to another embodiment of the present invention.

At this time, a basic configuration of the heater 110 is not different from that of the exemplary embodiment of FIGS. 3 to 6 (see FIG. 7), however, as shown in FIG. 12, a flange 111a is formed along a surrounding portion of the heater 110, more precisely, a surrounding portion of the base member 111 to be protruded, which is fastened with the bolt while it is bonded to the flange 121 of the protect cove 120.

As a result, the bonded portion of the flanges is fastened to a surrounding portion of the hole 1a of the reservoir 1 with the bolt 150 while the flange 111a of the heater 110 and the flange 121 of the protect cover 120 are bonded to fix the heater 110 and the protect cover 120, and at this time the connector for electric power 117 and the connector for thermistor 118 may be fixed to the protect cover 120.

Further, a waterproof pad 151 may be interposed preferably between the flange 111a of the heater 110 and the flange 121 of the protect cover 120 to be bonded each other, and between the flange 111a of the heater 110 and a boding portion of the reservoir 1 to prevent leakage of washer liquid.

In the heating device 100 fixed as described above, an upper surface of the heater 110 is exposed to the inside of the reservoir 1 so that the heater 110 can heat directly washer liquid.

Eventually, according to the heating device of washer liquid of the present invention, the washer liquid stored in the reservoir is heated directly and thus the problems caused from viscosity increase of washer liquid under low temperature, that is, a decline of discharging pressure of a washer pump, a poor supply of washer liquid and a poor landing location of washer liquid, a poor cleaning of glass, damages to a washer pump and an operation switch and the like can be improved.

According to the heating device of washer liquid of the present invention, it is installed integrally to a reservoir such that the washer liquid within an auxiliary tank to which a washer pump is installed is heated directly by a plate-type heater so that the problems caused from viscosity increase of washer liquid under low temperature, that is, a decline of discharging pressure of a washer pump, a poor supply of washer liquid and a poor landing location of washer liquid, a poor cleaning of glass, damages to a washer pump and an operation switch and the like can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A washer liquid heating apparatus integrated into a reservoir, comprising:
    a plate-type heater installed in a hole of the reservoir to heat a washer liquid within the reservoir;
    a protect cover assembled into the reservoir to surround the heater;
    a connection member connected along a surrounding portion of the heater; and
    a fastening device for fixing the heater and the protect cover to the reservoir,
    wherein the plate-type heater is fixed to be exposed to an inside of the reservoir through the hole such that a heating surface where heating is performed heats the washer liquid within the reservoir,
    wherein the fastening device is a ring-shaped mounting member that is pressed in the hole of the reservoir to be fixed to the hole while surrounding an outer surface of the connection member and a portion of the connection member and the protect cover, and
    wherein a catching groove is formed along a surrounding portion of an outer surface of the mounting member at a lower part of a portion of the mounting member that is inserted into the hole of the reservoir and the portion of the mounting member at an upper part serves as a catching step while a surrounding portion of the hole of the reservoir is fitted into the catching groove to be connected to the mounting member.

2. The washer liquid heating apparatus integrated into the reservoir of claim 1, wherein the heater comprises:
    a plate-type base member;
    a lower insulation layer laminated on the base member;
    a plurality of heating bodies laminated over the lower insulation layer;
    an electrode for applying external electric power to the heating bodies; and
    an upper insulation layer laminated over the heating bodies and the electrode,
    wherein the plurality of heating bodies formed to be long over the lower insulation layer are arranged at a predetermined interval to be patterned.

3. The washer liquid heating apparatus integrated into the reservoir of claim 1, wherein the connection member is formed in a ring shape and the heater is connected to an inside of the connection member, and first and second flanges are formed to be protruded along a surrounding portion of the connection member and the protect cover such that the mounting member is assembled to surround a bonded portion of the first flange of the connection member and the second flange of the protect cover while the first flange of the connection member and the second flange of the protect cover are bonded.

4. The washer liquid heating apparatus integrated into the reservoir of claim 1, wherein the mounting member is connected to the reservoir, the connection member, and the protect cover in a close contact state to prevent leakage of the washer liquid within the reservoir while the mounting member is pressed in the hole of the reservoir.

5. The washer liquid heating apparatus integrated into the reservoir of claim 1, wherein a flange of the heater is formed to be protruded along the surrounding portion of the heater, which is bonded to a flange of the protect cover, and the fastening device is a bolt for fastening the bonded portion while the flange of the heater, the flange of the protect cover, and a surrounding portion of the hole of the reservoir are bonded.

6. The washer liquid heating apparatus integrated into the reservoir of claim 5, wherein a waterproof pad is interposed between the flange of the heater and the flange of the protect cover to be bonded each other, and between the flange of the heater and the surrounding portion of the hole of the reservoir to prevent leakage of the washer liquid.

7. The washer liquid heating apparatus integrated into the reservoir of claim 1, wherein the hole of the reservoir to which the heater is installed is formed on a bottom or a floor of the reservoir where the washer liquid within the reservoir continuously remains.

* * * * *